(12) United States Patent
Rong (10) Patent No.: US 11,504,624 B2
(45) Date of Patent: Nov. 22, 2022

(54) METHOD AND APPARATUS FOR CONTROLLING MOVEMENT OF VIRTUAL OBJECT IN AUGMENTED REALITY, AND TERMINAL

(71) Applicant: NETEASE (HANGZHOU) NETWORK CO., LTD., Zhejiang (CN)

(72) Inventor: Hua Rong, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 0 days.

(21) Appl. No.: 16/614,385

(22) PCT Filed: Feb. 25, 2019

(86) PCT No.: PCT/CN2019/076008
§ 371 (c)(1),
(2) Date: Nov. 18, 2019

(87) PCT Pub. No.: WO2019/192270
PCT Pub. Date: Oct. 10, 2019

(65) Prior Publication Data
US 2021/0016177 A1    Jan. 21, 2021

(30) Foreign Application Priority Data
Apr. 3, 2018   (CN) .......................... 201810292180.3

(51) Int. Cl.
*A63F 13/655* (2014.01)
*G06T 11/00* (2006.01)
(Continued)

(52) U.S. Cl.
CPC .......... *A63F 13/655* (2014.09); *A63F 13/213* (2014.09); *A63F 13/216* (2014.09);
(Continued)

(58) Field of Classification Search
CPC .... A63F 13/655; A63F 13/213; A63F 13/216; A63F 2300/8082
See application file for complete search history.

(56) References Cited

U.S. PATENT DOCUMENTS 8,405,680 B1 * 3/2013 Cardoso Lopes ....... G06T 19/00
345/633
2008/0311983 A1   12/2008 Koempel et al.
(Continued)

FOREIGN PATENT DOCUMENTS

CN    103028243 A    4/2013
CN    106951080 A    7/2017
(Continued)

*Primary Examiner* — David L Lewis
*Assistant Examiner* — Shauna-Kay N. Hall
(74) *Attorney, Agent, or Firm* — Gang Yu (57) ABSTRACT

A method and apparatus for controlling a movement of a virtual object in AR, and a terminal are provided. The method includes: a virtual moving area is generated within a current image capture range of a control device; a virtual object is generated in the virtual moving area; and a position of a virtual identifier in the virtual moving area is adjusted according to a real movement of the control device, and the virtual object is guided to virtually move according to the position of the virtual identifier. The present disclosure solves a technical problem in the related art that a joystick-based racing control mode provided in an AR scene is complex and game experience is poor.

13 Claims, 3 Drawing Sheets

(51) Int. Cl.
*A63F 13/213* (2014.01)
*A63F 13/216* (2014.01)
*G06F 3/01* (2006.01)

(52) U.S. Cl.
CPC .............. *G06F 3/011* (2013.01); *G06T 11/00* (2013.01); *A63F 2300/8082* (2013.01)

(56) References Cited

U.S. PATENT DOCUMENTS

| | | | | |
|---|---|---|---|---|
| 2011/0205243 A1* | 8/2011 | Matsuda | ............. | G06F 3/04815 345/633 |
| 2012/0306775 A1* | 12/2012 | Miyachi | ............. | A63F 13/2145 345/173 |
| 2013/0162639 A1* | 6/2013 | Muench | ............. | A63F 13/655 345/419 |
| 2013/0178257 A1* | 7/2013 | Langseth | ............. | A63F 13/812 463/4 |
| 2013/0219942 A1* | 8/2013 | Thomas | ............. | F24F 1/56 312/236 |
| 2013/0249942 A1* | 9/2013 | Green | ............. | G06F 3/14 345/633 |
| 2014/0063061 A1* | 3/2014 | Reitan | ............. | G09G 3/003 345/633 |
| 2014/0218361 A1* | 8/2014 | Abe | ............. | A63F 13/42 345/424 |
| 2016/0267720 A1* | 9/2016 | Mandella | ............. | H04N 5/232 |
| 2017/0024934 A1* | 1/2017 | Numaguchi | ............. | A63F 13/213 |
| 2017/0270711 A1* | 9/2017 | Schoenberg | ............. | A63F 13/213 |
| 2017/0330362 A1* | 11/2017 | Sumner | ............. | A63F 13/52 |
| 2018/0267688 A1* | 9/2018 | Zhou | ............. | G06F 3/017 |
| 2020/0174552 A1* | 6/2020 | Stafford | ............. | A63F 13/212 |

FOREIGN PATENT DOCUMENTS

| | | |
|---|---|---|
| CN | 107126698 A | 9/2017 |
| CN | 107861682 A | 3/2018 |
| CN | 108543309 A | 9/2018 |

* cited by examiner

METHOD AND APPARATUS FOR CONTROLLING MOVEMENT OF VIRTUAL OBJECT IN AUGMENTED REALITY, AND TERMINAL

CROSS-REFERENCE TO RELATED APPLICATIONS

The present disclosure claims benefit of Chinese Patent Application No. 201810292180.3, filed on Apr. 3, 2018. Contents of the Chinese Patent Application are hereby incorporated by reference in its entirety.

TECHNICAL FIELD

The present disclosure relates to the field of Augmented Reality (AR) applications, and in particular to a method and apparatus for controlling a movement of a virtual object in AR, and a terminal.

BACKGROUND

Currently, there are fewer racing applications or games to be developed on AR technology. In the related art, a real-life racing demonstration developed by Toyota 86 is provided. An interactive method of the real-life racing demonstration is to generate a track and a racing car in a scene based on an AR camera, and to control the racing car by using a traditional left-right direction joystick. Specifically, a left and right turning of the racing car can be controlled by, using the left joystick, and a forward and backward movement of the racing car can be controlled by using the right joystick.

However, a problem of this method is that it is difficult to fully utilize advantages of AR technology simply by relying on a traditional joystick control mode.

An effective solution has not been provided yet currently for the above-mentioned problem.

SUMMARY

At least some embodiments of the present disclosure provides a method and apparatus for controlling a movement of a virtual object in AR, and a terminal, so at least to partially solve a technical problem in the related art that a joystick-based racing control mode provided in an AR scene is complex and game experience is poor.

In an embodiment of the present disclosure, a method for controlling a movement of a virtual object in AR is provided, which may include that:

a virtual moving area is generated within a current image capture range of a control device; a virtual object is generated in the virtual moving area; and a position of a virtual identifier in the virtual moving area is adjusted according to a real movement of the control device, and the virtual object is guided to virtually move according to the position of the virtual identifier.

Optionally, the step of generating the virtual moving area within the current image capture range may include: a real plane within the image capture range is determined in an image capture direction; and the virtual moving area is determined in the real plane.

Optionally, the step of generating the virtual object in the virtual moving area may include: a reference identifier is selected on the control device; the reference identifier is taken as a starting point, light emitted along the image capture direction is intersected with the real plane to obtain an intersection point, and the intersection point of the light and the real plane is set as the virtual identifier; and the virtual object is generated at the location of the virtual identifier.

Optionally, the step of adjusting the position of the virtual identifier according to the real movement and guiding the virtual object to virtually move according to the virtual identifier may include: the virtual identifier is triggered through the control device to move to an end point of a trajectory of the real movement according to the trajectory of the real movement; a moving speed of the virtual object is determined according to a distance between the virtual identifier and the virtual object, the moving speed being proportional to the distance; and the virtual object is guided to move to the position of the virtual identifier according to the moving speed.

Optionally, before determining the moving speed of the virtual object according to the distance between the position of the virtual identifier and the virtual object, the method may further include: an angle between a virtual connecting line, between the position of the virtual identifier and the virtual object, and a current orientation of the virtual object is acquired; and the current orientation is adjusted in real time according to the angle until a moving direction of the real movement is the same as the current orientation.

Optionally, the step of adjusting the position of the virtual identifier according to the real movement and guiding the virtual object to virtually move according to the virtual identifier may further include: it is determined that an obstacle is existed on a virtual connecting line between the position of the virtual identifier and the virtual object; an obstacle area occupied by the obstacle is detected; an obstacle surface relative to a current orientation of the virtual object is determined in the obstacle area; and the virtual object is guided to move laterally according to an angle between the obstacle surface and the virtual connecting line and a length of the virtual connecting line until controlling the virtual object to bypass the obstacle.

In another embodiment of the present disclosure, an apparatus for controlling a movement of a virtual object in AR is also provided, which may include:

a generation component, configured to generate a virtual moving area within a current image capture range of a control device, and generate a virtual object in the virtual moving area; and a control component, configured to adjust a position of a virtual identifier in the virtual moving area according to a real movement of the control device, and guide the virtual object to virtually move according to the virtual identifier.

Optionally, the generation component may include: a first determination element, configured to determine a real plane within the image capture range in an image capture direction; and a first generation element, configured to plan the virtual moving area in the real plane.

Optionally, the generation component may include: a selection element, configured to select a reference identifier on the control device; a setting element, configured to take the reference identifier as a starting point, intersect light emitted along the image capture direction with the real plane to obtain an intersection point, and set the intersection point of the light and the real plane as the virtual identifier; and a second generation element, configured to generate the virtual object at the location of the virtual identifier.

Optionally, the control component may include: a trigger element, configured to trigger the virtual identifier through the control device to move to an end point of a trajectory of the real movement according to the trajectory of the real movement; a second determination element, configured to determine a moving speed of the virtual object according to a distance between the virtual identifier and the virtual object, the moving speed being proportional to the distance; and a first control element, configured to guide the virtual object to move to the position of the virtual identifier according to the moving speed.

Optionally, the control component may further include: an acquisition element, configured to acquire an angle between a virtual connecting line, between the position of the virtual identifier and the virtual object, and a current orientation of the virtual object; and an adjustment element, configured to adjust the current orientation in real time according to the angle until a moving direction of the real movement is the same as the current orientation.

Optionally, the control component may further include: a third determination element, configured to determine that an obstacle is existed on a virtual connecting line between the position of the virtual identifier and the virtual object; a detection element, configured to detect an obstacle area occupied by the obstacle; a fourth determination element, configured to determine an obstacle surface of the current orientation of the virtual object in the obstacle area; and a second control element, configured to guide the virtual object to move laterally according to an angle between the obstacle surface and the virtual connecting line and a length of the virtual connecting line until controlling the virtual object to bypass the obstacle.

In another embodiment of the present disclosure, a storage medium is provided, which may include a stored program, and when the stored program is run, a device where the storage medium is located may be controlled to perform the above method for controlling the movement of the virtual object in the AR.

In another embodiment of the present disclosure, a processor is provided. The processor may be configured to run a program, and when the program is run, the above method for controlling the movement of the virtual object in the AR may be performed.

In another embodiment of the present disclosure, a terminal is provided, which may include: at least one processor, a memory, a display device, and at least one program, and the at least one program may be stored in the memory, and configured to be run by the at least one processor, the at least one program being configured to perform the above method for controlling the movement of the virtual object in the AR.

In the at least some embodiments of the present disclosure, through generating the virtual moving area within the current image capture range of the control device and generating the virtual object in the virtual moving area, the position of the virtual identifier in the virtual moving area is adjusted according to the real movement of the control device, and the virtual object is guided to virtually move according to the position of the virtual identifier. The purpose of guiding the movement of the virtual object by the real moving trajectory of the control device in the AR scene is achieved, thereby achieving technical effects of simple and easy operation mode, strong expansion and good game experience. Thus, the technical problem in the related art that a joystick-based racing control mode provided in an AR scene is complex and game experience is poor is solved.

BRIEF DESCRIPTION OF THE DRAWINGS

The accompanying drawings described herein are used for providing a further understanding of the present disclosure, and constitute a part of the present disclosure, and exemplary embodiments of the present disclosure and the description thereof are used for explaining the present disclosure, but do not constitute improper limitations to the present disclosure. In the drawings.

DETAILED DESCRIPTION

In order to make those skilled in the art better understand the solutions of the present disclosure, technical solutions in embodiments of the present disclosure will be clearly and completely described below with reference to the drawings in the embodiments of the present disclosure. It is apparent that the described embodiments are a part of the embodiments of the present disclosure, not all of the embodiments. On the basis of the embodiments of the present disclosure, all other embodiments obtained on the premise of no creative work of those of ordinary skill in the art should fall within the scope of protection of the present disclosure.

It is to be noted that the specification and claims of the disclosure and the terms "first", "second" and the like in the drawings are used for distinguishing similar objects, and do not need to describe a specific sequence or a precedence order. It will be appreciated that data used in such a way may be exchanged under appropriate conditions, in order that the embodiments of the present disclosure described here may be implemented in a sequence other than sequences graphically shown or described here. In addition, terms "include" and "have" and any variations thereof are intended to cover non-exclusive inclusions. For example, it is not limited for processes, methods, systems, products or devices containing a series of steps or elements to clearly list those steps or elements, and other steps or elements which are not clearly listed or are inherent to these processes, methods, products or devices may be included instead.

In an embodiment of the present disclosure, an embodiment of a method for controlling a movement of a virtual object in AR is provided. It is to be noted that the steps shown in the flowchart of the drawings may be executed in a computer system including, for example, a set of computer-executable instructions. Moreover, although a logic sequence is shown in the flowchart, the shown or described steps may be executed in a sequence different from the sequence here under certain conditions.

Figure 1:
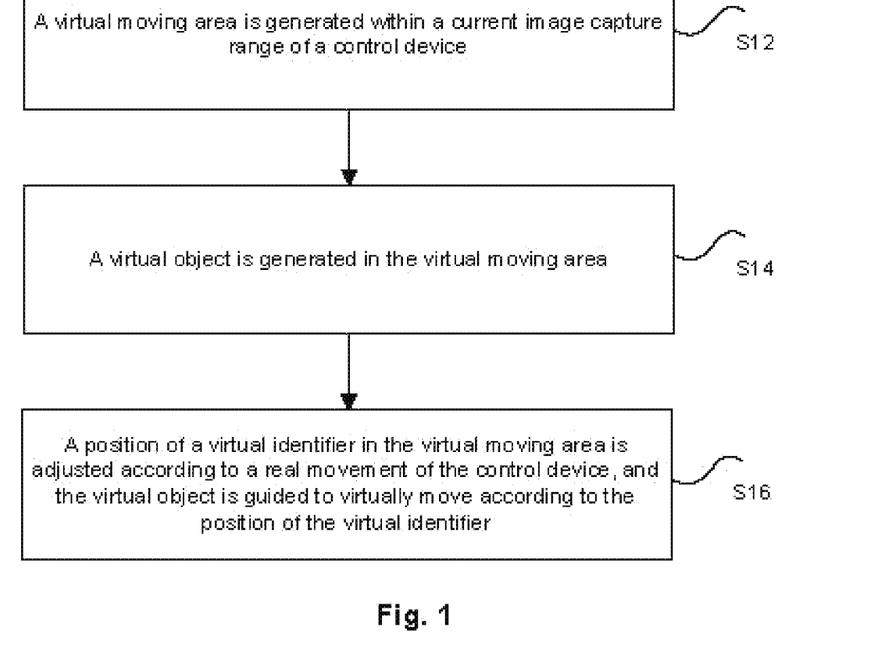
FIG. 1 is a flowchart of a method for controlling a movement of a virtual object in AR according to an embodiment of the present disclosure.

FIG. 1 is a flowchart of a method for controlling a movement of a virtual object in AR according to an embodiment of the present disclosure. As shown in FIG. 1, the method includes the following steps.

At step S12, a virtual moving area is generated within a current image capture range of a control device.

At step S14, a virtual object is generated in the virtual moving area.

At step S16, a position of a virtual identifier in the virtual moving area is adjusted according to a real movement of the control device, and the virtual object is guided to virtually move according to the position of the virtual identifier.

By means of the above steps, through generating the virtual moving area within the current image capture range of the control device and generating the virtual object in the virtual moving area, the position of the virtual identifier in the virtual moving area is adjusted according to the real movement of the control device, and the virtual object is guided to virtually move according to the position of the virtual identifier. The purpose of guiding the movement of the virtual object by the real moving trajectory of the control device in the AR scene is achieved, thereby achieving technical effects of simple and easy operation mode, strong expansion and good game experience. Thus, the technical problem in the related art that a joystick-based racing control mode provided in an AR scene is complex and game experience is poor is solved.

Optionally, at step S12, an operation of generating the virtual moving area within the current image capture range may include the following execution steps.

At step S121, a real plane within the image capture range is determined in an image capture direction.

At step S122, the virtual moving area is determined in the real plane.

The above control device may be a mobile terminal, such as a smart phone or a tablet computer. The control device may capture images through built-in cameras. After AR mode is turned on, the virtual moving area marked with a specific color (e.g., blue) that determined in the real plane (e.g., a desktop of a desk) may be photographed in the image capture direction. During a process of generating the virtual moving area, a game player may hold the mobile terminal in alignment with the above real plane to remain stationary. At this time, a generation progress may be displayed in a display interface of the mobile terminal, and after maintaining for a time period, the virtual moving area (e.g., a track used in a racing game) is generated in the virtual scene.

Optionally, at step S14, an operation of generating the virtual object in the virtual moving area may include the following execution steps.

At step S141, a reference identifier is selected on the control device.

At step S142, the reference identifier is taken as a starting point, light emitted along the image capture direction is intersected with the real plane to obtain an intersection point, and the intersection point of the light and the real plane is set as the virtual identifier.

At step S143, the virtual object is generated at the location of the virtual identifier.

Figure 2:
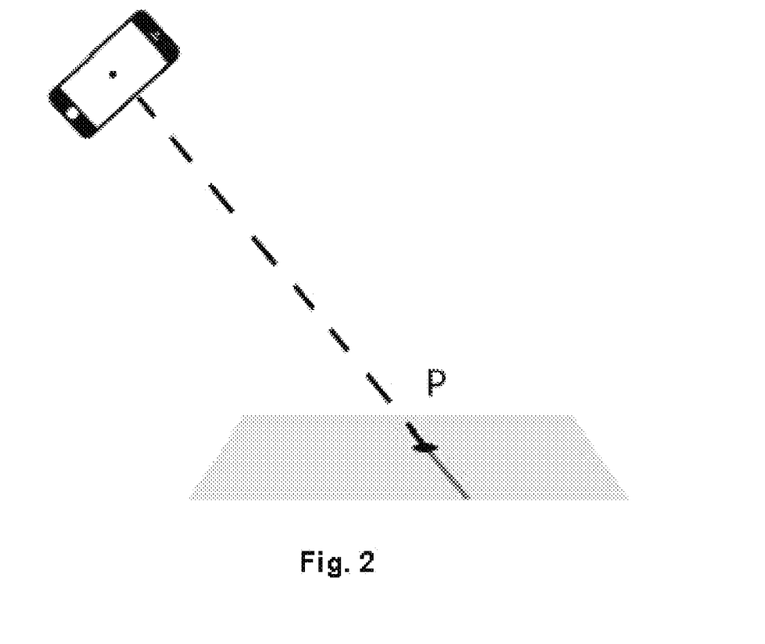
FIG. 2 is a schematic diagram of generating a virtual object according to an optional embodiment of the present disclosure.

FIG. 2 is a schematic diagram of generating a virtual object according to an optional embodiment of the present disclosure. As shown in FIG. 2, the reference identifier (i.e., a moving determination point), such as, a center position of the display screen of the mobile terminal or the center focus of a camera of the mobile terminal, may be selected on the control device. Secondly, a ray emitted from the reference identifier intersects with the real plane to determine the virtual identifier (i.e., an intersection point in the virtual moving area) in the virtual moving area, which may be marked as a point P (equivalent to the above virtual identifier). Then, the virtual object (e.g., a racing car used in a racing game) is generated at a virtual scene position corresponding to the virtual identifier. Finally, the point P will be a target point for guiding the virtual object to move. The reference identifier is an identifier with a visual indication corresponding to the virtual identifier and displayed on the display screen of the mobile terminal. That is, the virtual identifier moves in the virtual moving area as the mobile terminal moves. The position of the reference identifier on the display screen keeps constant.

Optionally, at step S16, an operation of adjusting the position of the virtual identifier in the virtual moving area according to the real movement of the control device and guiding the virtual object to virtually move according to the virtual identifier may include the following execution steps.

At step S161, the virtual identifier is triggered through the control device to move to an end point of a trajectory of the real movement according to the trajectory of the real movement.

At step S165, a moving speed of the virtual object is determined according to a distance between the virtual identifier and the virtual object, the moving speed being proportional to the distance.

At step S166, the virtual object is guided to move to the position of the virtual identifier according to the moving speed.

The position change of the virtual identifier may be triggered by the trajectory of the real movement of the control device, and a position of the end point of the trajectory of the real movement is determined as a current position of virtual identifier. The virtual object moves toward the current position of the virtual identifier in the corresponding scene to form a reference line between the virtual object and the current position of virtual identifier. The reference line is used for indicating the position and advancing direction of the virtual object. The moving speed of the virtual object may be determined by a distance between the virtual object and the current position of the virtual identifier. As the distance between the virtual object and the current position of the virtual identifier is greater, the moving speed of the virtual object is higher, and as the distance between the virtual object and the current position of the virtual identifier is smaller, the moving speed of the virtual object will continue to decrease. When the virtual object moves to the current position of the virtual identifier, the moving speed of the virtual object may decrease to zero. That is, an initial speed of the virtual object is determined according to the distance between the virtual object and the current position of the virtual identifier, and in a process of moving, by following physical laws (such as ground resistance, etc.), the moving speed of the virtual object gradually decreases.

Optionally, before the step S165 of determining the moving speed of the virtual object according to the distance between the position of the virtual identifier and the virtual object, the method may include the following execution steps.

At step S162, an angle between a virtual connecting line, between the position of the virtual identifier and the virtual object, and a current orientation of the virtual object is acquired.

At step S163, the current orientation is adjusted in real time according to the angle until a moving direction of the real movement is the same as the current orientation.

If the position of the virtual identifier is not in the direction of the current orientation of the virtual object, the virtual object may first turn to the direction of the current orientation of the virtual identifier, and then to go straight toward the position of the virtual identifier.

Figure 3:
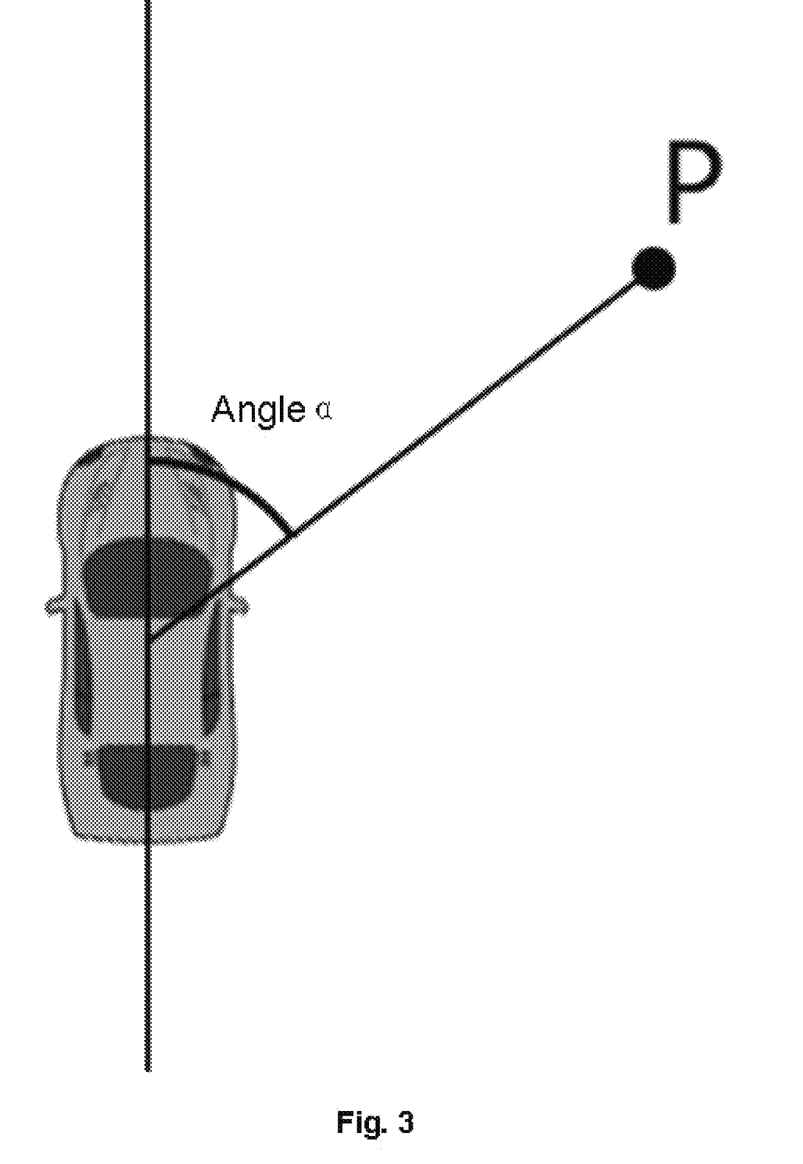
FIG. 3 is a schematic diagram of a turning process of a virtual object according to an optional embodiment of the present disclosure.

FIG. 3 is a schematic diagram of a turning process of a virtual object according to an optional embodiment of the present disclosure. As shown in FIG. 3, a connecting line between the position of a virtual identifier and a center position of a virtual object is set as a first connecting line, and a connecting line between a head and tail of the virtual object in a current orientation of the virtual object is set as a second connecting line. An angle α is formed between the first connecting line and the second connecting line. The virtual object is turned to a direction of the angle α with a fixed turning angle per second until the angle α is reduced to zero, and then linearly moves to a point P.

In addition, during the turning of the virtual object, if the position of the point P changes, the angle α changes according to the position change of the point P, and the virtual object may continue to turn or change turning until the angle α decreases to zero.

Optionally, at step S16, the operation of adjusting the position of the virtual identifier in the virtual moving area according to the real movement of the control device and guiding the virtual object to virtually move according to the virtual identifier may further include the following execution steps.

At step S167, it is determined that an obstacle is existed on a virtual connecting line between the position of the virtual identifier and the virtual object.

At step S168, an obstacle area occupied by the obstacle is detected.

At step S169, an obstacle surface relative to a current orientation of the virtual object is determined in the obstacle area.

At step S170, the virtual object is guided to move laterally according to an angle between the obstacle surface and the virtual connecting line and a length of the virtual connecting line until controlling the virtual object to bypass the obstacle.

In the virtual moving area, if there is an obstacle on the connecting line between the position of the virtual identifier and the virtual object, prompt information will be sent. For example, the connecting line between the position of the virtual identifier and the virtual object is displayed in red. At this time, the virtual object will be blocked by the obstacle and may not keep moving forward. The determination rule for determining whether there is an obstacle on the connecting line between the position of the virtual identifier and the virtual object and determining a volume of the obstacle may be supported by an AR live-action technology and an object recognition technology, so that the obstacle area is determined according to the position occupied by the obstacle and the volume of the obstacle.

Figure 4:
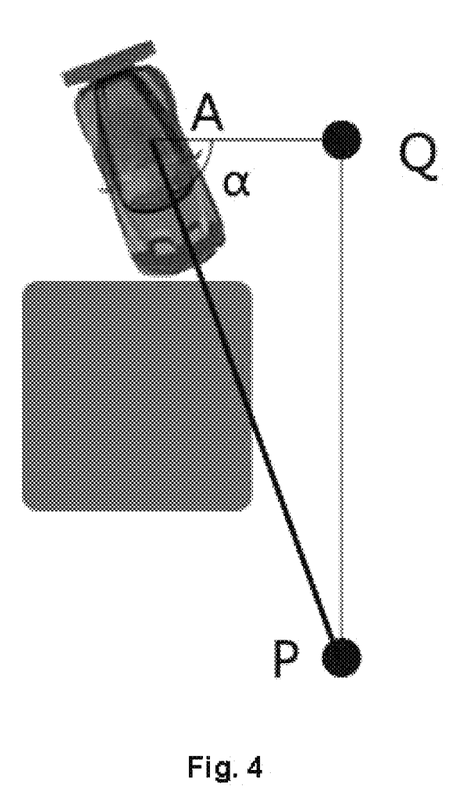
FIG. 4 is a schematic diagram of a virtual object keeping moving after avoiding an obstacle according to an optional embodiment of the present disclosure.

If the connecting line between the position of the virtual identifier and the virtual object is perpendicular to the obstacle surface of the obstacle oriented by the virtual object, the virtual object may stop moving. FIG. 4 is a schematic diagram of a virtual object keeping moving after avoiding an obstacle according to an optional embodiment of the present disclosure. As shown in FIG. 4, by changing the position of the virtual identifier (i.e., point P), the position of the virtual identifier is no longer in the direction of the current orientation of the virtual object, so the virtual object may first turn to the position of the virtual identifier, and then it is determined that the connecting line between the position of the virtual identifier and the virtual object and the obstacle surface of the obstacle oriented by the virtual object may form an angle α. Thus, the virtual object will move laterally at a fixed speed until there is no obstacle in front. And a distance of lateral movement is a length of AQ, and AQ=AP*cos α.

Figure 5:
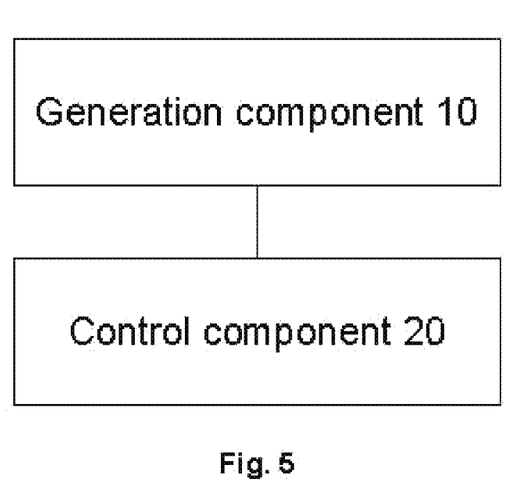
FIG. 5 is a structural block diagram of an apparatus for controlling a movement of a virtual object in AR according to an embodiment of the present disclosure.

In another embodiment of the present disclosure, an embodiment of an apparatus for controlling a movement of a virtual object in AR is provided. FIG. 5 is a structural block diagram of an apparatus for controlling a movement of a virtual object in AR according to an embodiment of the present disclosure. As shown in FIG. 5, the apparatus includes: a generation component 10, configured to generate a virtual moving area within a current image capture range of a control device, and generate a virtual object in the virtual moving area; and a control component 20, configured to adjust a position of a virtual identifier in the virtual moving area according to a real movement of the control device, and guide the virtual object to virtually move according to the virtual identifier.

Optionally, the generation component 10 includes: a first determination element (not shown in the figure), configured to determine a real plane within the image capture range in an image capture direction; and a first generation element (not shown in the figure), configured to plan the virtual moving area in the real plane.

Optionally, the generation component 10 includes: a selection element (not shown in the figure), configured to select a reference identifier on the control device; a setting element (not shown in the figure), configured to take the reference identifier as a starting point, intersect light emitted along the image capture direction with the real plane to obtain an intersection point, and set the intersection point of the light and the real plane as the virtual identifier; and a second generation element (not shown in the figure), configured to generate the virtual object at the location of the virtual identifier.

Optionally, the control component 20 includes: a trigger element (not shown in the figure), configured to trigger the virtual identifier through the control device to move to an end point of a trajectory of the real movement according to the trajectory of the real movement; a second determination element (not shown in the figure), configured to determine a moving speed of the virtual object according to a distance between the virtual identifier and the virtual object, the moving speed being proportional to the distance; and a first control element (not shown in the figure), configured to guide the virtual object to move to the position of the virtual identifier according to the moving speed.

Optionally, the control component 20 further includes: an acquisition element (not shown in the figure), configured to acquire an angle between a virtual connecting line, between the position of the virtual identifier and the virtual object, and a current orientation of the virtual object; and an adjustment element (not shown in the figure), configured to adjust the current orientation in real time according to the angle until a moving direction of the real movement is the same as the current orientation.

Optionally, the control component 20 further includes: a third determination element (not shown in the figure), configured to determine that an obstacle is existed on a virtual connecting line between the position of the virtual identifier and the virtual object; a detection element (not shown in the figure), configured to detect an obstacle area occupied by the obstacle; a fourth determination element (not shown in the figure), configured to determine an obstacle surface of the current orientation of the virtual object in the obstacle area; and a second control element (not shown in the figure), configured to guide the virtual object to move laterally according to an angle between the obstacle surface and the virtual connecting line and a length of the virtual connecting line until controlling the virtual object to bypass the obstacle.

In another embodiment of the present disclosure, a storage medium is also provided, which includes a stored program, and when the stored program is run, a device where the storage medium is located is controlled to perform the above method for controlling the movement of the virtual object in the AR. The storage medium may include, but is not limited to, various media capable of storing a program code such as a U disk, a Read-Only Memory (ROM), a Random Access Memory (RAM), a mobile hard disk, a magnetic disk or an optical disc.

In another embodiment of the present disclosure, a processor is also provided. The processor is configured to run a program, and when the program is run, the above method for controlling the movement of the virtual object in the AR is performed. The processor may include but is not limited to any processing device such as a Micro Controller Unit (MCU) or a Field Programmable Gate Array (FPGA).

In another embodiment of the present disclosure, a terminal is also provided. The terminal includes at least one processor, a memory, a display device and at least one program. The at least one program is stored in the memory, and is configured to be executed by the at least one processor. The at least one processor is configured to perform the above method for controlling the movement of the virtual object in the AR. In some embodiments, the terminal may be a terminal device such as a smart phone (for example, an Android handset, an iOS handset, etc.), a tablet PC, a pocket PC, a Mobile Internet Device (MID) and a Personal Digital Assistant (PDA). The display device may be a Liquid Crystal Display (LCD) through which a user may interact with a user interface of the terminal. In addition, the terminal may further includes an input/output interface (I/O interface), a Universal Serial Bus (USB) port, an Internet interface, a power supply and/or a camera.

The above serial numbers of the embodiments of the present disclosure are for the description, and do not represent the advantages and disadvantages of the embodiments.

In the above embodiments of the present disclosure, descriptions of each embodiment are emphasized respectively, and parts which are not elaborated in detail in a certain embodiment may refer to relevant descriptions of other embodiments.

In several embodiments provided by the present disclosure, it is to be understood that the disclosed technical content may be implemented in other manners. The device embodiments described above are illustrative. For example, the division of the element may be a logical function division. In actual implementation, there may be another division manner, for example, multiple elements or components may be combined or integrated into another system, or some features may be ignored or not executed. In addition, the coupling or direct coupling or communication connection shown or discussed may be an indirect coupling or communication connection through some interfaces, elements or components, and may be electrical or otherwise.

The elements described as separate components may or may not be physically separated, and the members displayed as elements may or may not be physical elements, that is, may be located in one place, or may be distributed to multiple elements. Some or all of the elements may be selected according to actual needs to achieve the purpose of the solution of the present embodiment.

In addition, each functional element in each embodiment of the present disclosure may be integrated into a processing element, each element may also physically exist independently, and two or more than two elements may also be integrated into an element. The integrated element may be implemented in a hardware form and may also be implemented in form of software functional element.

The integrated element may be stored in a computer-readable storage medium if being implemented in the form of a software functional element and sold or used as a standalone product. Based on such understanding, the technical solution of the present disclosure, which is essential or contributes to the related art, may be embodied in the form of a software product stored in a storage medium (such as a ROM/RAM, a magnetic disk and an optical disc), including a number of instructions for causing a terminal device (which may be a mobile phone, a computer, a server, or a network device, etc.) to perform the methods described in various embodiments of the present disclosure. The foregoing storage medium includes: a U disk, a ROM, a RAM, a mobile hard disk, a magnetic disk, or an optical disk, and the like, which may store a program code.

The above are exemplary implementations of the present disclosure. It is to be noted that a number of modifications and refinements may be made by those of ordinary skill in the art without departing from the principles of the present disclosure, and such modifications and refinements are also considered to be within the scope of protection of the present disclosure.

What is claimed is:

1. A method for controlling a movement of a virtual object in Augmented Reality (AR), comprising:
    generating a virtual moving area within a current image capture range of a control device;
    generating a virtual object in the virtual moving area; and
    adjusting a position of a virtual identifier in the virtual moving area according to a real movement of the control device, and guiding the virtual object to virtually move according to the virtual identifier;
    wherein adjusting the position of the virtual identifier according to the real movement and guiding the virtual object to virtually move according to the virtual identifier comprises:
    triggering the virtual identifier through the control device to move to an end point of a trajectory of the real movement according to the trajectory of the real movement; determining a moving speed of the virtual object according to a distance between the virtual identifier and the virtual object, the moving speed being proportional to the distance; and guiding the virtual object to move to the position of the virtual identifier according to the moving speed.

2. The method as claimed in claim 1, wherein generating the virtual moving area within the current image capture range comprises:
    determining a real plane within the image capture range in an image capture direction; and
    determining the virtual moving area in the real plane.

3. The method as claimed in claim 2, wherein generating the virtual object in the virtual moving area comprises:
    selecting a reference identifier on the control device;
    taking the reference identifier as a starting point, intersecting light emitted along the image capture direction with the real plane to obtain an intersection point, and setting the intersection point of the light and the real plane as the virtual identifier; and
    generating the virtual object at the location of the virtual identifier.

4. A processor, configured to run a program, wherein when the program is run, the method for controlling the movement of the virtual object in the AR as claimed in claim 1 is performed.

5. The method as claimed in claim 4, wherein adjusting the position of the virtual identifier according to the real movement and guiding the virtual object to virtually move according to the virtual identifier further comprises:

determining that an obstacle is existed on a virtual connecting line between the position of the virtual identifier and the virtual object;

detecting an obstacle area occupied by the obstacle;

determining an obstacle surface relative to a current orientation of the virtual object in the obstacle area; and guiding the virtual object to move laterally according to an angle between the obstacle surface and the virtual connecting line and a length of the virtual connecting line until controlling the virtual object to bypass the obstacle.

6. A non-transitory storage medium, comprising a stored program, wherein when the stored program is run, a device where the storage medium is located is controlled to perform the method for controlling the movement of the virtual object in the AR as claimed in claim 1.

7. The method as claimed in claim 4, wherein before determining the moving speed of the virtual object according to the distance between the position of the virtual identifier and the virtual object, the method further comprises:

acquiring an angle between a virtual connecting line, between the position of the virtual identifier and the virtual object, and a current orientation of the virtual object; and adjusting the current orientation in real time according to the angle until a moving direction of the real movement is the same as the current orientation.

8. A terminal, comprising: at least one processor, a memory, a display device, and at least one program, wherein the at least one program is stored in the memory, and configured to be run by the at least one processor, the at least one program being configured to perform the method for controlling the movement of the virtual object in the AR as claimed in claim 1.

9. An apparatus for controlling the movement of a virtual object in Augmented Reality (AR), comprising a hardware processor coupled with a memory and configured to execute program components stored on the memory, wherein the program components comprise:

a generation component, configured to generate a virtual moving area within a current image capture range of a control device, and generate a virtual object in the virtual moving area; and a control component, configured to adjust a position of a virtual identifier in the virtual moving area according to a real movement of the control device, and guide the virtual object to virtually move according to the virtual identifier;

wherein the control component comprises: a trigger element, configured to trigger the virtual identifier through the control device to move to an end point of a trajectory of the real movement according to the trajectory of the real movement; a second determination element, configured to determine a moving speed of the virtual object according to a distance between the virtual identifier and the virtual object, the moving speed being proportional to the distance; and a first control element, configured to guide the virtual object to move to the position of the virtual identifier according to the moving speed.

10. The apparatus as claimed in claim 9, wherein the generation component comprises:

a first determination element, configured to determine a real plane within the image capture range in an image capture direction; and a first generation element, configured to plan the virtual moving area in the real plane.

11. The method as claimed in claim 10, wherein the generation component comprises:

a selection element, configured to select a reference identifier on the control device;

a setting element, configured to take the reference identifier as a starting point, intersect light emitted along the image capture direction with the real plane to obtain an intersection point, and set the intersection point of the light and the real plane as the virtual identifier; and a second generation element, configured to generate the virtual object at the location of the virtual identifier.

12. The apparatus as claimed in claim 9, wherein the control component further comprises:

an acquisition element, configured to acquire an angle between a virtual connecting line, between the position of the virtual identifier and the virtual object, and a current orientation of the virtual object; and an adjustment element, configured to adjust the current orientation in real time according to the angle until a moving direction of the real movement is the same as the current orientation.

13. The apparatus as claimed in claim 9, wherein the control component further comprises:

a third determination element, configured to determine that an obstacle is existed on a virtual connecting line between the position of the virtual identifier and the virtual object;

a detection element, configured to detect an obstacle area occupied by the obstacle;

a fourth determination element, configured to determine an obstacle surface relative to a the current orientation of the virtual object in the obstacle area; and a second control element, configured to guide the virtual object to move laterally according to an angle between the obstacle surface and the virtual connecting line and a length of the virtual connecting line until controlling the virtual object to bypass the obstacle.

* * * * *